(12) United States Patent
David et al.

(10) Patent No.: US 8,361,532 B2
(45) Date of Patent: Jan. 29, 2013

(54) RECOMBINED WHOLE GRAIN WHEAT HAVING VISUALLY INDISTINGUISHABLE PARTICULATE MATTER AND RELATED BAKED PRODUCTS

(75) Inventors: Mingus J. David, New Hope, MN (US); Robert T. Westercamp, Cedar Rapids, IA (US); Steven J. Cox, Long Lake, MN (US); Dennis L. Schlueter, St. Paul, MN (US); Sarah Woodling, Golden Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 25 days.

(21) Appl. No.: 12/870,907

(22) Filed: Aug. 30, 2010

(65) Prior Publication Data

US 2010/0323088 A1 Dec. 23, 2010

Related U.S. Application Data

(63) Continuation of application No. 11/749,194, filed on May 16, 2007, now abandoned.

(60) Provisional application No. 60/800,951, filed on May 17, 2006.

(51) Int. Cl.
*A21D 2/00* (2006.01)
(52) U.S. Cl. .......................... 426/622; 426/615; 426/549
(58) Field of Classification Search .................. 426/622, 426/615, 549
See application file for complete search history.

(56) References Cited

U.S. PATENT DOCUMENTS

| 6,457,250 | B1 | 10/2002 | Mingus et al. |
| 6,881,429 | B2 | 4/2005 | Geng et al. |
| 2005/0136174 | A1 | 6/2005 | Korolchuk et al. |
| 2006/0073240 | A1 | 4/2006 | David et al. |
| 2006/0073258 | A1 | 4/2006 | Korolchuk |
| 2007/0269579 | A1 | 11/2007 | Mingus et al. |

FOREIGN PATENT DOCUMENTS

CA 2141974 A1 6/1998

OTHER PUBLICATIONS

J.E. Dexter, B.A. Marchylo, Aug. 2004, Website Printout: *Recent Trends in Durum Wheat Milling and Pasta Processing: Impact on Durum Wheat Quality Requirements*, Canadian Grain Commission, http://grainscanada.gc.ca/Pubs/confpaper/Dexter/trends/qualreg5-e.htm, 3 pages website print-out.
ConAgra Food Ingredients, Aug. 2005, Website Printout: *Ultragrain Overview*, http://www.conagrafoodingredients.com/difference/ultragrain.jsp, 3 pages website print-out.
E. Schroeder, Jun. 2005, *The Whole Grains Wake-Up Call*, Food Business News, 1 page.

*Primary Examiner* — Rena Dye
*Assistant Examiner* — Chaim Smith
(74) *Attorney, Agent, or Firm* — John L. Crimmins; Aleya R. Champlin

(57) ABSTRACT

A recombined whole grain flour for use in preparing whole grain products such that whole grain particulates provide minimal visual impact to the whole grain product. By selectively controlling the particle size of the milled bran and germ constituents used in the recombined whole grain flour, the visual and color impact associated with bran and germ particulates can be substantially eliminated from the whole grain product. In particular, whole grain products such as whole grain breads, dough products, mixes and biscuits can be made with recombined whole grain flour. Whole grain products made with recombined whole grain flour are advantageous in that they incorporate the health advantages associated with whole grains while eliminating the characteristic, visual color differences noticeable within a whole grain crumb due to visually identifiable bran and germ particulates found in traditional whole grain products.

4 Claims, 4 Drawing Sheets

RECOMBINED WHOLE GRAIN WHEAT HAVING VISUALLY INDISTINGUISHABLE PARTICULATE MATTER AND RELATED BAKED PRODUCTS

PRIORITY CLAIM

The present application is a continuation application of U.S. patent application Ser. No. 11/749,194 filed on May 16, 2007 now abandoned, and claims priority to U.S. Provisional Application Ser. No. 60/800,951 filed May 17, 2006 and entitled, "RECOMBINED WHOLE GRAIN WHEAT HAVING VISUALLY INDISTINGUISHABLE PARTICULATE MATTER AND RELATED BAKED PRODUCTS", which is herein incorporated by reference to the extent not inconsistent with the present disclosure.

FIELD OF THE INVENTION

The invention relates generally to baking products with whole grains. The invention relates more particularly to whole grain products made with recombined whole grain flour.

BACKGROUND OF THE INVENTION

For centuries, grains have been grown and harvested as one of the most basic food staples. Grains including corn, wheat, durum, rye, oats and others are traditionally ground into flour for use as the main building block for making a variety of baked goods, including breads, pastas, tortillas and dessert items.

Regardless of the grain type, the individual grain kernels comprise a fibrous exterior shell referred to as bran, an interior starch portion called the endosperm, and a nutrient-rich core called the germ. During milling of the grain kernels, processes can be used to separate and remove the bran and germ from the endosperm resulting in a refined grain that is almost pure starch. While refined grains have advantages such as appearance and consistency, health studies have suggested that diets high in starches, like those from refined grains, play a role in certain unhealthy conditions, such as, obesity, heart disease and diabetes among others. Conversely, many of these same studies have indicated that the use of whole grains or grains that contain the entire kernel, including the bran, endosperm and germ, promote certain health advantages.

One reason suggested for the health advantages associated with whole grains is that the bran and germ are both nutrient-rich portions of the grain kernel and include concentrated portions of essential vitamins and nutrients. Further, the fibrous make-up of bran provides an excellent source of dietary fiber. Studies have shown that diets rich in whole grains can reduce the risk of heart disease, diabetes and certain cancers. Furthermore, other studies have suggested that individuals who consume whole grains tend to eat less, and as a consequence, may weigh less or lose weight.

While the use of whole grains in baking provides numerous health benefits, the use of whole grains can lead to a significant difference in appearance compared to traditional white breads made with refined wheat. In particular, the use of whole grains in baking products can result in visual particulate matter that is visible and distinguishable in the final baked product due to color and size differences between the bran, endosperm and germ. To the consumer, the presence of visual particulate matter and color differences may be less preferred than, for example, refined, white-style bread, which tends to have very uniform color and generally no visible particulates.

Due to the specific health benefits associated with bran consumption, it may be desired to provide a bran fortified whole grain for use in preparing whole grain products. However, bran generally makes up the majority of the visual particulate matter in whole grains, such that, a bran fortified whole grain can have significantly larger amounts of visible particulate matter making the bran fortified whole grain visually less preferred than a non-fortified whole grain.

SUMMARY OF THE INVENTION

The invention addresses the aforementioned needs of providing a whole grain product comprising recombined whole grain constituents that are recombined so as to provide minimal visual impact to the whole grain product. By selectively controlling the particle size of the milled bran and germ constituents used in the recombined whole grain, the visual impact associated with bran and germ particulates can be substantially eliminated from the recombined whole grain. In particular, presently contemplated embodiments can comprise a whole grain product, such as, whole grain breads, dough products, mixes and biscuits made with recombined whole grain flour. Representative embodiments of recombined whole grain products contemplated by the present disclosure are advantageous in that they incorporate the health advantages associated with whole grains while eliminating the characteristic, visual color differences noticeable within the crumb due to particulates, such as, bran and germ particulates found in traditional whole grain products.

Within the scope of the disclosure, recombining whole grain constituents that have been milled to desired particle sizes, have been found to produce a whole grain flour wherein particulate matter, such as, for example, bran particulates and germ particulates, have little to no visual impact on the overall appearance of the recombined whole grain flour. When milled bran and germ particulate matter is present in a size range of about 0.006 inches to about 0.017 inches, the milled bran and germ particulate matter has been found to have minimum particulate visibility against the majority endosperm background of a baked good. In an alternative embodiment, the bran and/or germ particulate matter can be present in a size range from about 0.007 inches to about 0.015 inches. Particulate matter can comprise bran particulate matter and/or germ particulate matter.

In one aspect, the disclosure is directed to representative embodiments of whole grain baked products made with recombined whole grain flour. Presently contemplated whole grain flour based baked products can comprise bread, biscuits, bagels, bread sticks, buns, cakes, rolls, English muffins, pizza crust, tortillas, pancakes, waffles, battered and breaded products, such as, for example, corn dogs and breaded vegetables, cookies, soft and hard pretzels, crackers and the like. The recombined whole grain based baked products can comprise products in a variety of states, such as, for example, raw, partially or par-baked, pre-baked, fresh baked and shelf-stable baked products. In some representative embodiments, these recombined whole grain products can subsequently be refrigerated and/or frozen for use and/or storage.

In another aspect, the disclosure relates to embodiments of a non-fully baked, recombined whole grain dough, e.g., a raw or par-baked recombined whole grain dough, made with recombined whole grain flour. The recombined whole grain dough can be freshly prepared for immediate use or can comprise a frozen or refrigerated recombined whole grain dough for use at a time subsequent to dough preparation.

Representative recombined whole grain dough products can comprise pizza crust dough, bread dough, cake dough, roll dough, biscuit dough and bread stick dough.

In another aspect, the disclosure relates to embodiments of a recombined whole grain baking mix made with recombined whole grain flour for preparing whole grain baked products having little to no visible particulate matter. The recombined whole grain baking mix can comprise a substantially anhydrous complete mix requiring only the addition of at least one liquid or wet ingredient, such as, for example, water, oil and/or eggs, or a concentrated mix or premix comprising one or more functional ingredients blended into an amount of recombined whole grain flour requiring the addition of bulk ingredients, such as, for example, a bulk portion of recombined whole grain flour at a time of preparation. Concentrated mixes or premixes can be formulated to include any number of functional ingredients based upon a desired level of completeness by a user of such concentrated mix or premix, which is frequently a commercial bakery or food service group. Representative recombined whole grain mixes, in either a complete or concentrated mix/premix can comprise mixes for bread dough, pizza crust, cakes, brownies, cookies, pancake batter, muffins as well as variety baking mixes, such as, for example, BISQUICK® variety baking mix available from General Mills, Inc. of Minneapolis, Minn.

In another aspect, the disclosure relates to partially baked or "par-baked" whole grain products made with recombined whole grain flour. Generally, the par-baked whole grain product requires an additional thermal processing step, such as, for example, heating, baking, frying, microwaving and the like, to achieve a fully baked format.

In another aspect, representative methods for preparing a recombined whole grain baked product can comprise milling bran and germ particulate matter to desired particle sizes so as to reduce and/or substantially eliminate the visual impact of the particulate matter within the recombined whole grain baked product. The recombined whole grain baked products achieve commonly accepted standards for whole grain baked products including Baked Specific Volume, slice height, symmetry and cell structure.

In another aspect, a representative embodiment of a whole grain baked product can comprise an amount of recombined whole grain flour so as to achieve recommended whole grain levels as suggested and promulgated by the Whole Grains Council of Boston, Mass. For instance, whole grain baked products of the present disclosure can comprise levels of recombined whole grain flour in an amount satisfying the "Good Source" standard of at least 8 grams of whole grains per serving. Alternatively, the whole grain baked products can comprise levels of recombined whole grain flour in an amount satisfying the "Excellent Source" standard of at least 16 grams of whole grains per serving. Finally, the whole grain baked products can comprise recombined whole grain flour satisfying the "100% Whole Grain" standard wherein all of the grains are whole grains. In some embodiments, recombined whole grain flour can comprise 100% of the total whole grains within the whole grain baked product.

In another aspect, whole grain constituents can be recombined so as to form fortified versions of recombined whole grain flour. For example, a bran fortified whole grain flour can be prepared through the addition of milled bran in amounts exceeding the level of bran typically found in whole grain flour. In addition to adding milled bran, milled germ can be added either individually or in combination with the milled bran to form a germ or bran/germ fortified whole grain flour.

As used throughout the present disclosure, "recombined whole grain product" refers to whole grain products, such as, but not limited to, biscuits, bagels, bread sticks, buns, cakes, rolls, English muffins, pizza crust, tortillas, pancakes, waffles, batter-based products, breaded products, cookies, soft pretzels, hard pretzels and crackers, that are formulated using a fortified or non-fortified recombined whole grain flour.

As used throughout the present disclosure, the term "fortified" is intended to refer to the addition of one or more components that are generally already present within whole grain flour beyond the levels generally attributed to milling of a whole grain. One representative example can include a bran fortified recombined whole grain flour where the amounts of bran added during a recombination step can exceed the levels of bran that would be present from simply milling the whole grain. In addition, recombined whole grain flour according to the present disclosure can be fortified with increased amount of germ, either individually or in combination with bran.

As used throughout the present disclosure, the term "recombined" is intended to describe the reintegration of individual grain components such as, for example, endosperm, bran and germ, into an integral, whole grain flour. The individual grain components can be previously separated for any of a variety of reasons including for individual milling of bran and/or germ to desired particle sizes.

BRIEF DESCRIPTION OF THE DRAWINGS

The disclosure may be more completely understood in consideration of the following detailed description of various representative embodiments of the invention in connection with the accompanying drawings, in which.

Figure 1:
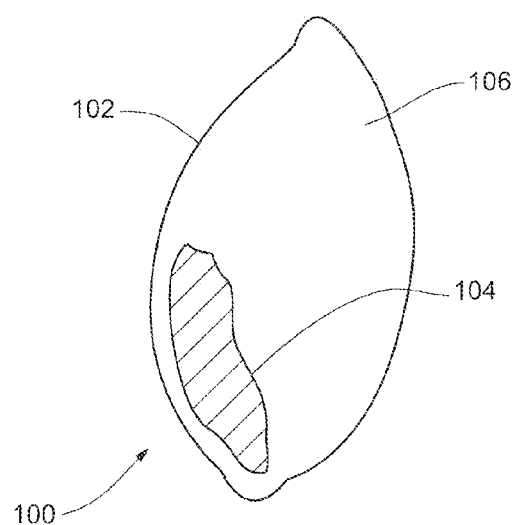
FIG. 1 is a representative depiction of a section view of a grain kernel.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure as defined by the appended claims.

DETAILED DESCRIPTION OF THE PREFERRED EMBODIMENTS

In representative embodiments of the invention as disclosed herein, whole grain baked products and related whole grain products are comprised of recombined whole grain flour. Representative embodiments of recombined whole grain flour comprise individually milled and recombined portions of endosperm, bran and germ, wherein the bran portion and/or germ portions are milled to have particle sizes within a desired particle size range wherein the desired particle size range has been found to minimize the visual and color impact of the bran and/or germ within the recombined whole grain flour. In some embodiments, the bran and/or germ portions can be milled to have particle sizes from about 0.006 inches to about 0.017 inches. In another representative embodiment, the bran and/or germ portions can be milled to have particle sizes from about 0.007 inches to about 0.015 inches. An embodiment of the whole grain baked products and related products can be formulated such that the recombined whole grain flour comprises from about 0.1% to about 100% of the farinaceous content. In another alternative embodiment, the whole grain baked products and related products can be formulated such that recombined whole grain baked products can comprise a good source of whole grain providing at least 8 grams of whole grain per serving. In another alternative embodiment, the whole grain baked products and related products can be formulated, such that, the recombined whole grain baked products comprise an excellent source of whole grain providing at least 16 grams of whole grain per serving.

As illustrated in FIG. 1, a grain kernel 100 comprises a hard outer shell called bran 102, a nutrient-rich core called germ 104 and an interior starch portion called endosperm 106. Grain kernel 100 is representative of differing grain varieties, such as, for example, wheat kernels (including spring and winter wheat, as well as, varieties including red, white, spelt, emmer, faro, einkorn, KAMUT® which is a variety of Khorasan wheat available from Kamut International, Ltd. of Great Falls, Mont., and durum), amaranth, barley, buckwheat, corn (including whole cornmeal and popcorn), millet, oats, quinoa, rice (including brown and colored rice), rye, sorghum, teff, triticale and wild rice. When grain kernel 100 comprises a wheat kernel, bran 102 generally comprises about 14.5% by weight of the kernel, germ 104 generally comprises about 2.5% by weight of the kernel and endosperm 106 generally comprises the balance or about 83% by weight of the kernel. As will be understood by one of skill in the art, the amounts of bran 102, germ 104 and endosperm 106 will vary according to the grain type.

Figure 2:
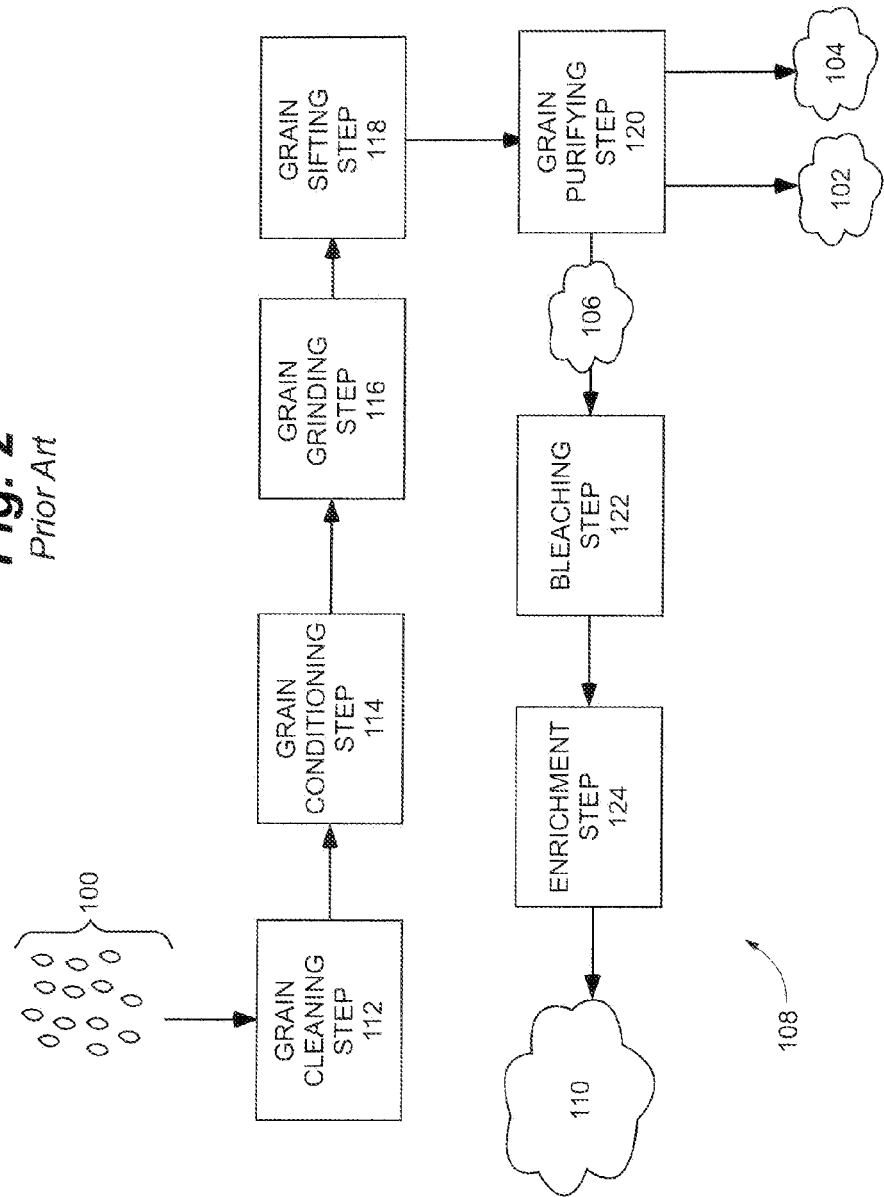
FIG. 2 is a schematic illustration of a representative milling process for milling a refined, wheat flour.

In a conventional milling operation 108 as schematically illustrated in FIG. 2, grain kernel 100 can be milled to form refined flour 110. In its most basic form, milling operation 108 can comprise a grain cleaning step 112, a grain conditioning step 114, a grain grinding step 116, a grain sifting step 118 and a grain purifying step 120. When making refined flour 110, grain purifying step 120 is followed by a bleaching step 122 and an enrichment step 124.

Within grain cleaning step 112, a variety of processes can be utilized to separate the grain from foreign materials. Representative cleaning techniques can comprise the use of magnetic separators, vibratory screens, air aspirators, de-stoning machines, disc separators, scourers, used individually or in suitable combinations.

Within grain conditioning step 114, a variety of processes can be utilized to prepare the grain for grinding. Representative conditioning processes can include a tempering process and an impact scouring step, applied individually or in combination.

Within grain grinding step 116, grain kernel 100 is gradually reduced to a smaller, desired flour size by passing size graded kernels and middlings through rollers adjusted to break the grain kernel 100 into the bran 102, germ 104 and endosperm 106. Representative roller adjustments can include roller positioning, roller speed and selection of the rolling surface.

Within grain sifting step 118, the ground bran 102, germ 104 and endosperm 106 can be shaken and separated within a series of box-like sifters having screens with openings that get sequentially smaller and smaller. Generally, large particles are shaken and removed from a top sifter while the finest particles or flour sift to the bottom.

Within grain purifying step 120, the ground bran 102 is lifted and separated from germ 104 and endosperm 106 by a controlled air stream. The remaining germ 104 and endosperm 106 can then be passed through a series of break rolls wherein germ 104 is flattened for easier separation and the endosperm 106 is ground into flour.

Within bleaching step 122, the flour consisting essentially of ground endosperm 106 is exposed to a bleaching-maturing agent, such as, for example, chlorine gas or benzoyl peroxide, to both whiten the flour and mature or oxidize the flour to improve the baking characteristics of the flour.

Within enrichment step 124, a measured quantity of enrichment components, such as, for example, thiamin, niacin, riboflavin, iron, folic acid, leavening agent, salt and calcium, are added to the whitened/matured flour.

Figure 3:
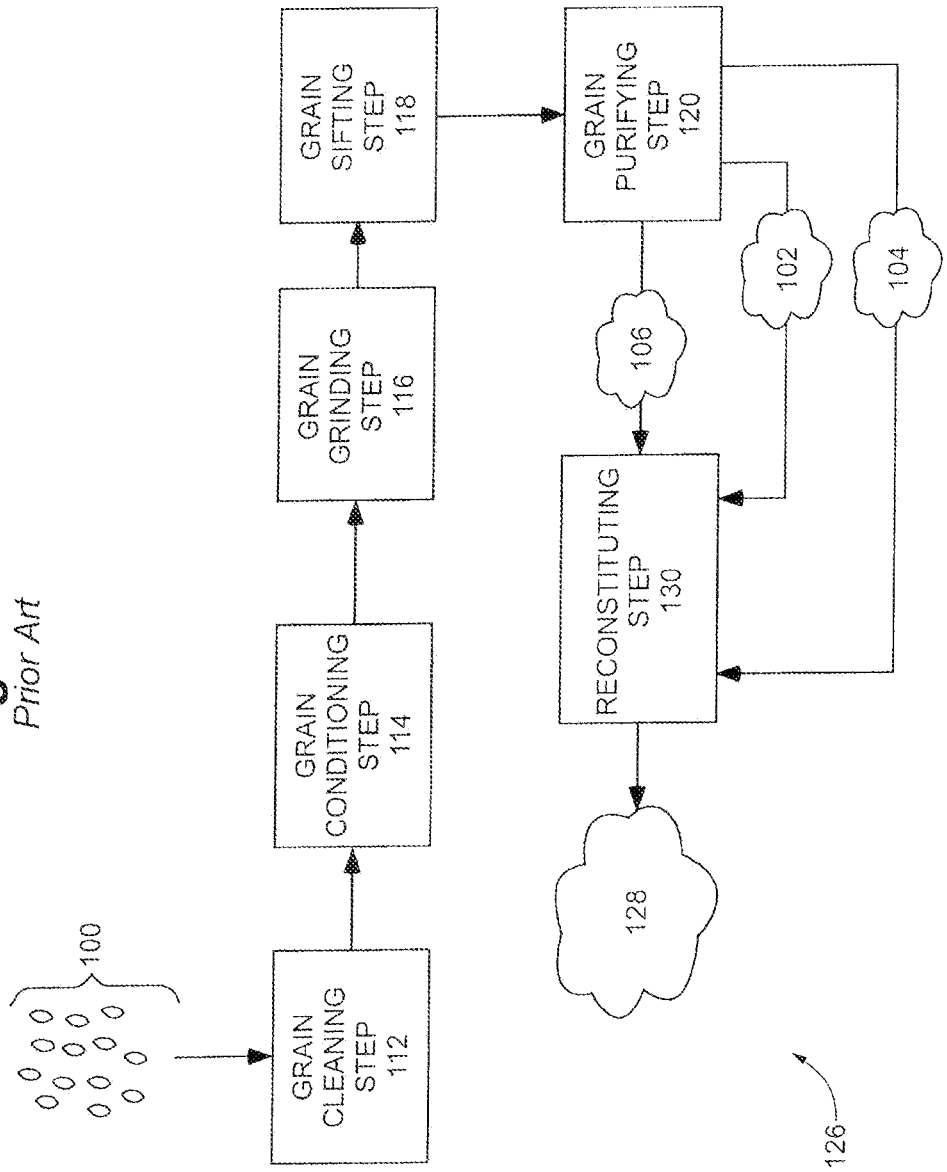
FIG. 3 is a schematic illustration of a representative milling process for milling a whole grain wheat flour.

In a whole grain milling operation 126 as schematically illustrated in FIG. 3, grain kernel 100 can be milled to form whole grain flour 128. Whole grain milling operation 126 similarly comprises grain cleaning step 112, grain conditioning step 114, grain grinding step 116, grain sifting step 118 and grain purifying step 120. Following grain purifying step 120, a reconstituting step 130 blends back the separated portions of the grain kernel 100, for example, the milled bran, germ and endosperm to form whole grain flour 128. Through the use of reconstituting step 130, whole grain flour 128 can be stabilized. In addition, whole grain milling operation 126 can comprise one or more heat treating steps so as to further stabilize the bran and/or germ.

When milled with whole grain milling operation 126, whole gain flour 128 includes visual particulate matter that is viewable and distinguishable by an unassisted eye in baked products made with the whole grain flour 128 due to color differences between the bran 102, germ 104 and endosperm 106. To the consumer, the presence of visual particulate matter within a final baked product can be less preferred than the generally visually homogenous appearance of baked products made with refined flour 110.

Figure 4:
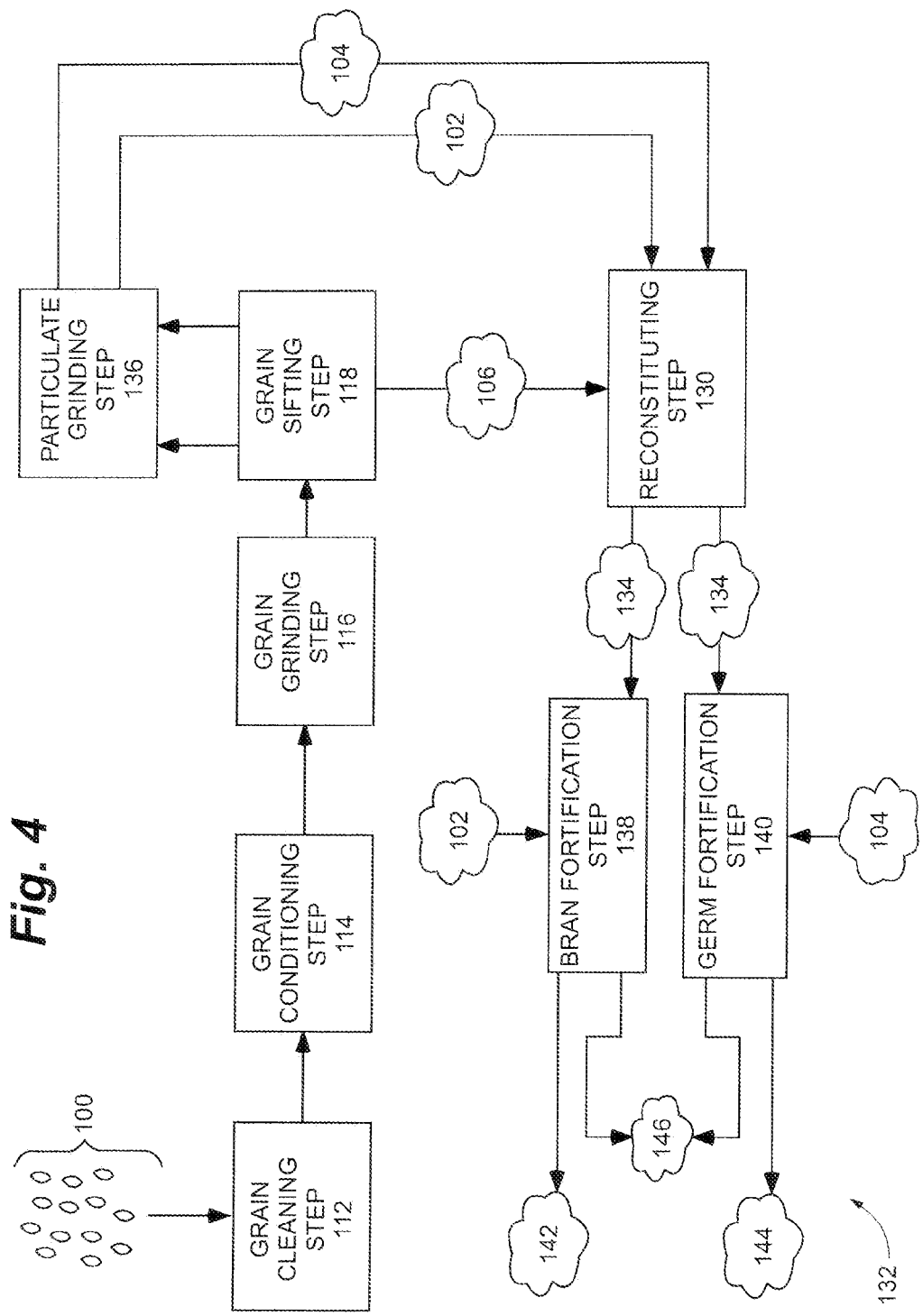
FIG. 4 is a schematic illustration of a representative milling process for milling a whole grain wheat flour having particulate matter that is visually indistinguishable to an unassisted eye.

As illustrated in FIG. 4, a milling recombination process 132 of the invention for milling grain kernel 100 to form a substantially visually homogenous whole grain flour 134 resembles whole grain milling operation 126 with the further inclusion of a particulate grinding step 136. Within particulate grinding step 136, bran 102 and germ 104 which, generally comprise the visually distinguishable particulate matter in whole grain flour 128, are ground to a desired particle size that has been surprisingly found to provide a visually indistinguishable homogenous appearance when viewed with the unassisted eyed to baked products made with whole grain flour 134. More specifically, bran 102 and germ 104 are milled in the particulate grinding step 136 so as to have a selected particle size in a range from about 0.006 inches to about 0.017 inches, which has been surprisingly found to limit the unassisted eye to distinguish bran 102 and germ 104 from the background of the majority milled endosperm 106. More preferably, bran 102 and germ 104 can be milled to have particle sizes ranging from about 0.007 inches to about 0.015 inches.

Referring to Table 1 below, milling recombination process 132 was simulated on a conventional red wheat grain to confirm particle size ranges for bran 102 that provided a grain flour and resulting baked product in which the bran 102 is visually indistinguishable from the majority endosperm 106 background. As illustrated in Table 1, milling recombination process 132 was simulated using 6 different particle ranges for bran 102, with the resulting flour and baked products being compared against one another in addition to being compared with conventional milled non-whole red wheat brans.

TABLE 1

Comparison of baked products produced from recombined flour having bran particles milled to a specified size range.

| | | Size | | |
|---|---|---|---|---|
| Bran Style | Bran Particulate Size Range (inches) | "L" measurement | "A" measurement | "B" measurement |
| Coarse Bran | Variable with >45% by weight larger than 0.041 | 70.07 | 4.02 | 14.89 |
| Medium Bran | Variable with >6% by weight larger than 0.041 | 63.65 | 4.23 | 15.69 |
| Red Bran | 0.033-0.059 | 65.92 | 5.51 | 16.30 |
| Red Bran | 0.017-0.033 | 63.86 | 5.90 | 16.05 |
| Red Bran | 0.009-0.017 | 62.63 | 5.75 | 16.53 |
| Red Bran | 0.007-0.009 | 64.99 | 4.50 | 17.71 |
| Red Bran | 0.006-0.007 | 63.20 | 5.22 | 17.47 |
| Red Bran | <0.006 | 66.98 | 4.35 | 17.73 |

Each sample was individually evaluated with respect to the color or "lightness" of the bread produced with the different bran particle sizes. For many consumers, particularly children, lightness is generally associated with taste and a light or white-like appearance for the internal crumb is generally preferred. The internal crumb color of breads can be objectively measured using standard techniques known to one in the art such as, for example, using a Minolta Chroma Meter available from the Minolta Corporation of Ramsey, N.J., to measure the reflective color of a surface. Using the Minolta Chroma Meter, the appearance of the different bread products were measured using the L*a*b color scale, wherein "L*" corresponds to a lightness measurement based on a black to white scale, "a*" corresponds to measurements on a red to green scale and "b*" corresponds to measurements on a blue to yellow scale. Generally, it has been found that bread products having increased "L*" measurements, reduced "a*" measurements and increased "b*" measurements are most preferred as consumers tend to associate such readings with conventional white breads. In addition to measuring crumb color, each of the breads products was visually compared using an unassisted eye to compare the various bran particle size ranges with respect to visibility of the bran particles against the crumb (milled endosperm and germ) background.

In comparing bran visibility against the crumb background, it was determined that the bread products prepared from recombined flour having bran particles milled to a range of 0.006 inches to 0.017 inches had the least amount of visible contrast between the bran particles and the crumb without adversely affecting background color.

In some embodiments, milling recombination process 132 can further comprise a bran fortification step 138 and/or a germ fortification step 140 as illustrated in FIG. 4 for forming a bran fortified whole grain flour 142, a germ fortified whole grain flour 144 or a bran and germ fortified whole grain flour 146. In milling recombination process 132, bran 102 and/or germ 104 that has been milled to the desired advantageous particle size range can be added to the endosperm 106 in amounts exceeding the typical amounts of bran 102 and/or germ 104 found in the grain kernel 100, such as, for example, adding bran 102 such that the amount of bran 102 in whole grain flour 134 exceeds 14.5% by weight of a whole wheat flour made according to the milling recombination process 132. Accordingly, germ 104 can be added in amounts such that germ 104 exceeds 2.5% by weight of a whole wheat flour made according to the milling recombination process 132.

Whole grain flour 134 can be used within a variety of baked products and related products. For example, whole grain flour 134 can be used in the preparation of whole grain baked products, such as, for example, breads and whole grain biscuits having cross-sectional slices displaying a consistent, homogeneous color and visual appearance. In another example, whole grain flour 134 can be used in baking kits, such as, anhydrous mixes requiring the addition of wet ingredients, such as, for example, water, oil, eggs the like, or in bulk concentrate mixes or premixes requiring additional bulk ingredients prior to baking. Whole grain flour 134 can be used in preparing baking dough, such as, frozen dough, refrigerated dough and fresh dough. Whole grain flour 134 can also be used in the preparation of partially-baked or "par-baked" products that require baking to completion prior to consumption. In addition, whole grain flour 134 can be used in the preparation of "stiff" dough for use in crackers and pretzels. While the use of whole grain flour 134 is specifically described, it will be understood that bran fortified whole grain flour 142, germ fortified whole grain flour 144 and bran and germ fortified whole grain flour 146 can be utilized instead of or in conjunction with whole grain flour 134.

As described throughout the specification, the attainment of certain dough characteristics are more important in some doughs than in others, and depend largely on the intended end use of the dough product. It will be understood that the term dough as used through the present specification applies equally to refrigerated, raw dough products that are formed as either a developed dough or an undeveloped dough. Developed dough is that in which a protein or gluten network has been more or less fully formed or created. Representative examples of developed doughs can include dough for breads, bagels, croissants or rolls. Undeveloped dough is that in which, the gluten network is not fully developed. One representative example of an undeveloped dough is biscuit dough and batters.

Dough formulations, and the ingredients they contain, can differ depending on the finished product that is obtained from the dough. However, most doughs generally have a number of ingredients in common and examples of some such common ingredients are described and illustrated in more detail below.

The dough formulation and products as described herein, generally contain an amount of whole grain flour 134 constituent that contributes to the structure of the dough. The whole grain flour 134 provides the dietary benefits associated with consumption of whole grains. As described herein, whole grain baked products, mixes and dough, as contemplated by the present disclosure comprise at least about 15% whole grain flour 134 within the flour constituent. In some contemplated embodiments, whole grain baked products, mixes and dough can comprise at least about 30% whole grain flour 134 within the flour constituent. In some embodiments, whole grain baked products can comprise substantially all, or greater than about 90%, whole grain flour 134 within the flour constituent. In some embodiments, whole grain flour 134 can be utilized in conjunction with other suitable whole grain flour, such as, for example, durum whole grain flour, or alternatively, with refined flour 110.

Whole grain dough compositions comprised of whole grain flour 134, as described herein, can be caused to expand (leaven) by any leavening mechanism, such as, by one or more of the effects of: entrapped gas, such as, entrapped carbon dioxide, entrapped air, or both; a laminated dough structure; by action of chemical leavening agents; or by action of a biological agent, such as, a yeast. Thus, a leavening agent may be an entrapped gas, such as, layers or cells (bubbles) that contain carbon dioxide, water vapor, or air, etc., any type of yeast (e.g., cake yeast, cream yeast, dry yeast, etc.); or a chemical leavening system, e.g., containing a basic chemical leavening agent and an acidic chemical leavening agent that react to form a leavening gas, such as, carbon dioxide.

Examples of acidic chemical leavening agents are generally known in the dough and baking arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), glucono-delta-lactone (GDL), as well as, a variety of others. Optionally, an acidic chemical leavening agent for use according to the invention, can be encapsulated.

Examples of basic chemical leavening agents include many that are generally known in the dough and baking arts, such as, soda, i.e., sodium bicarbonate ($NaHCO_3$), potassium bicarbonate ($KHCO_3$), ammonium bicarbonate ($NH_4HCO_3$), etc. A basic chemical leavening agent may also be encapsulated, if desired.

The evolution of carbon dioxide essentially follows the stoichiometry of typical acid-base reactions. The amount of leavening base present determines the amount of carbon dioxide evolved, whereas the type of leavening acid affects the speed at which the carbon dioxide is liberated. The amount of leavening base used in combination with the leavening acid can be balanced, such that a minimum of unchanged reactants remain in the finished product. An excess amount of leavening base can impart a bitter flavor to the final product, while excess leavening acid can make the baked product tart.

Yeast is also utilized for leavening baked goods, and is often preferred because of the desirable flavor it imparts to the dough. Baker's yeast is generally supplied in three forms: yeast cream, a thick suspension with about 17% solids; a moist press cake with about 30% solids; and an active dry yeast, with about 93 to 98% solids. Generally, active dry yeasts of acceptable quality have been available for some time, and recently instant active dry yeast has also been available for commercial use.

The quantity of yeast added to dough is directly related to the time required for fermentation, and the form of the yeast utilized. Generally, most bread doughs are made with from about 2 to 3% fresh compressed yeast, based on the amount of flour.

Whole grain dough comprising whole grain flour 134 as described herein can also contain additional functional ingredients. Some such additional ingredients can be used to modify the texture of the whole grain dough. Texture modifying agents can improve many properties of the dough, such as, viscoelastic properties, plasticity, or dough development. Examples of texture modifying agents include fats, emulsifiers, enzymes, hydrocolloids, and the like.

Shortening helps to improve the volume, grain and texture of the final product. Shortening also has a tenderizing effect and improves overall palatability and flavor of a baked good. Either natural shortenings, animal or vegetable, or synthetic shortenings can be used. Generally, shortening is comprised of triglycerides, fats and fatty oils made predominantly of triesters of glycerol with fatty acids. Fats and fatty oils useful in producing shortening include cotton seed oil, ground nut oil, soybean oil, sunflower oil, rapeseed oil, sesame oil, olive oil, corn oil, safflower oil, palm oil, palm kernel oil, coconut oil, or combinations thereof.

Emulsifiers include nonionic, anionic, and/or cationic surfactants that can be used to influence the texture and homogeneity of a dough mixture, increase dough stability, improve eating quality, and prolong palatability. Emulsifiers include compounds, such as, lecithin, mono- and diglycerides of fatty acids, propylene glycol mono- and diesters of fatty acids, glyceryl-lacto esters of fatty acids, and ethoxylated mono- and diglycerides.

Hydrocolloids are added to dough formulations to increase moisture content, and to improve viscoelastic properties of the dough and the crumb texture of the final product. Hydrocolloids function both by stabilizing small air cells within the batter and by binding to moisture within the dough. Hydrocolloids include compounds, such as, xanthan gum, guar gum, and locust bean gum.

Dough-developing agents can also be added to the system to increase dough viscosity, texture and plasticity. Any number of agents known to those of skill in the art may be used including azodicarbonamide, diacetyl tartaric acid ester of mono- and diglycerides (DATEM) and potassium sorbate.

Another example of a dough-developing additive is PROTASE™. PROTASE™ is a proprietary product containing enzymes and other dough conditioners. PROTASE™ is generally used to reduce mixing time and improve machinability. A double strength version, PROTASE 2X™, is commercially obtained from J. R. Short Milling Co. (Chicago, Ill.).

Dough conditioners are also examples of dough additives. One example of a dough conditioner is NUBAKE™, commercially available from RIBUS (St. Louis, Mo.). Another example of a dough conditioner is L-cysteine, commercially available from B.F. Goodrich (Cincinnati, Ohio).

Dough can also frequently contain nutritional supplements, such as, vitamins, minerals and proteins, for example. Examples of specific nutritional supplements include thiamin, riboflavin, niacin, iron, calcium, or mixtures thereof.

Dough can also include flavorings, such as, sweeteners, spices, and specific flavorings, such as, bread or butter flavoring. Sweeteners include regular and high fructose corn syrup, sucrose (cane or beet sugar), and dextrose, as well a bake stable non-nutritive sweeteners such as sucralose, for example. In addition to flavoring the baked good, sweeteners, such as, sugar can increase the moisture retention of a baked good, thereby increasing its tenderness.

Dough can also include preservatives and mold inhibitors, such as, sodium salts of propionic or sorbic encapsulated acids, sodium diacetate, vinegar, monocalcium phosphate, lactic acid and mixtures thereof.

Preparation of whole grain products can be accomplished using traditional mixing methods to form a whole grain dough from whole grain flour 134. Generally, the whole grain flour 134 can be combined with various wet ingredients, such as, for example, water, oil, eggs and milk, using traditional mixers and mixing methods. For example, whole grain flour 134 can be combined with suitable wet ingredients using any standard mixing technology, such as, for example, a standard horizontal bar mixer or a paddle mixer available from the Hobart Corporation of Troy, Ohio.

Whole grain bread dough, as used herein, can comprise a variety of formulations wherein the flour portion of the bread dough can solely comprise a single variety of whole grain flour 134 or can comprise various combinations of whole grain flour 134, such as, for example, whole grain wheat flour and whole grain durum flour. Alternatively, refined flour 110 can also be combined with whole grain flour 134. In some embodiments, a whole grain bread dough can be classified as a "Good Source," wherein the whole grain bread dough is formulated so as to provide 8 grams of whole grain per serving (generally considered 2 slices or 50 grams of bread). In some embodiments, a whole grain bread dough can be classified as an "Excellent Source," wherein the whole grain bread dough is formulated so as to provide 16 grams of whole grain per serving. In some embodiments, a whole grain bread dough can be classified as a "100% Whole Grain," wherein the whole grain bread dough is formulated such that the flour portion of the bread dough solely comprises whole grain flour 134.

As the percentage of whole grain flour 134 increases in a bread dough, vital wheat gluten can be added in an effective amount so as to improve the bake qualities of a whole grain bread including increasing the Baked Specific Volume (BSV) of the whole grain bread. BSV is a term of art in the industry that defines the inverse of density or fluffiness of a baked good, and is simply the volume of the baked product divided by its weight. For bread products, BSV is frequently used as an objective measurement for non-sliced or artisan breads. Generally, a baked good is considered to have an acceptable BSV when the baked good doubles in size during baking from a raw dough to a baked dough product. More specifically, a traditionally accepted BSV for traditional white bread generally exceeds about 3.0 cc/g. As such, effective amounts of vital wheat gluten for use with whole grain bread dough will achieve baked whole grain breads having a BSV exceeding about 3.0 cc/g. Adding vital wheat gluten to a mixture comprising whole grain flour 134 compensates for whole grain baking characteristics, which can inhibit achieving desired baked good characteristics. In addition to formulating whole grain bread dough with an effective amount of vital wheat gluten, effective amounts of vital wheat gluten can be added to baking mixes, either complete mixes or concentrated mixes or premixes, such that a user experiences the same baking performance as traditional mixes or mixtures based upon refined flour 110.

In addition to use in the preparation of whole grain breads, whole grain flour 134 can be similarly employed for use in whole grain baking mixes for preparing whole grain baked products. These whole grain mixes can comprise a complete anhydrous mix requiring the addition of a liquid, such as, for example, water, oil, eggs and/or milk, or a concentrate mix requiring additional bulk ingredients, as well as, liquid ingredients, at a time of preparation. A complete mix is generally considered a mix in which all of the dry ingredients necessary for preparing a dough are present in the mix, including the flour portion. A concentrate mix or premix is generally considered a mix including one or more key functional ingredients but still requiring addition of one or more bulk ingredients. At time of use, bulk ingredients, such as, for example, a bulk whole grain flour portion and/or vital wheat gluten can be added to the concentrate mix or premix. Depending upon the application and the end user, representative whole grain baking mixes, including whole grain flour 134 can be provided at varying levels of completeness between the concentrate mix and the complete mix.

Key functional ingredients can comprise one or more of dough conditioners, hydrocolloids, protein sources, oxidizers, mold inhibitors, salt, and nutrients blended with flour, used to provide specific attributes to a finished baked product. Representative dough conditioners can comprise DATEM, enzymes, sodium stearoyl lactylate and monoglycerides. Representative hydrocolloids can comprise guar gum. Representative protein sources can comprise vital wheat gluten. Representative oxidizers can comprise ascorbic acid and azodicarbonamide. Representative mold inhibitors can comprise calcium propionate. Representative whole grain baking premixes can comprise effective amounts of functional ingredients, such as, for example, vital wheat gluten, dough conditioners, emulsifiers, preservatives, salt, nutrients and the like, blended with whole grain flour other whole grain ingredients.

Whole grain bread dough mixes, either complete mixes or concentrated mixes or premixes, can include functional ingredients such that whole grain breads made from the mix and whole grain flour 134 achieve a BSV of at least about 2.5 cc/g and/or a slice height of at least about 4.0 inches. Alternatively, other whole grain products based on whole grain flour 134 and milled whole grain mixes, either complete mixes or concentrated mixes or premixes, can be specifically tailored to provide desirable characteristics to other baked products such as, for example, cookie spread for whole grain cookie mixes, slice height and cell structure for whole grain cake mixes, spread and height for whole grain pancakes. Further characteristics that can be tailored can include, for example, appropriate bake performance for other whole grain flour 134 based mixes including pizza crust mixes, brownie mixes, muffin mixes and variety baking mixes such as, for example, Bisquick® mix.

Exemplary Evaluations

Six different breads were formulated and prepared for visual comparison by experienced observers. Three of the breads were formulated using whole grain flour 134 while the remaining three breads were used as test controls and did not undergo milling recombination process 132. The bread types used for testing were as listed in Table 2.

TABLE 2

Sample Bread Description

| Bread Number | Bread Description | Visual Description |
|---|---|---|
| 1 | Bread formulated with recombined red whole wheat milled according to milling recombination process 132. | Pale color with small red particulates visible |
| 2 | Bread formulated with recombined white whole wheat milled according to milling recombination process 132. | Tan color with small particulates visible |
| 3 | Bread formulated with recombined durum whole grain milled according to milling recombination process 132. | Yellow color with small particulates visible |
| 4 | White bread formulated with bleached and refined flour milled according to conventional milling operation 108. | White |
| 5 | Bread formulated with finely ground durum whole grain including finely ground bran and germ particulates. | Yellow color with no visually identifiable particulates |
| 6 | White wheat ultra fine bread formulated with finely ground whole wheat including finely ground bran and germ particulates. | Tan color with no visually identifiable particulates |

Experienced observers viewed and rated the sample breads based on appearance characteristics including: Overall Appearance, Color and Amount of Visible Particulate Flecks. In addition, consumers were asked to consider how each bread sample fit the concept of a visually appealing whole grain bread, whether they were likely to purchase the sample breads and whether or not they felt their children would eat the sample breads. Results of the experienced observer consumer rankings are summarized in Table 3.

TABLE 3

Visual Ratings

| Characteristic | Bread 1 | Bread 2 | Bread 3 | Bread 4 | Bread 5 | Bread 6 |
|---|---|---|---|---|---|---|
| Like Overall Appearance 0 (least)-9 (most) | 7.0 | 6.3 | 6.3 | 6.1 | 5.9 | 5.3 |
| Like Color 0 (least)-9 (most) | 6.8 | 6.2 | 6.2 | 6.1 | 5.8 | 5.2 |
| Color Rating 0 (light)-7 (dark) | 4.4 | 4.0 | 4.0 | 1.8 | 2.9 | 3.6 |
| Liked amount of grain flecks 0 (disliked)-9 (liked) | 6.5 | 5.8 | 5.6 | 5.1 | 5.3 | 4.8 |
| Amount of grain flecks 0 (none)-7 (many) | 5.2 | 3.2 | 3.1 | 1.6 | 2.2 | 2.5 |
| Concept Fit 0 (poor)-5 (good) | 3.7 | 3.5 | 3.4 | 3.3 | 3.4 | 3.2 |
| Purchase Intent After Visual 0 (no intent)-5 (intend to purchase) | 3.5 | 3.3 | 3.3 | 3.1 | 3.1 | 3.0 |
| Children Would Eat 0 (would not eat)-5 (would eat) | 4.7 | 4.8 | 4.8 | 5.0 | 4.7 | 4.6 |

Experienced observer responses indicated that the reviewers did perceive visual distinctions among the bread samples. The recombined red whole wheat bread (Sample 1) having red wheat milled using milling recombination process 132 was liked best for overall appearance, color and amount of grain fleck liking. For concept fit and purchase intent after visual, the recombined red whole wheat bread received higher ratings than the recombined white whole wheat bread (Sample 2) and the recombined durum whole wheat bread (Sample 3) and had significantly higher ratings than the remaining bread samples. The white wheat ultra fine bread was liked consistently less than the other whole grain breads. As indicated in the consumer testing, milling recombination process 132 can be used successfully to recombine whole wheat flour having bran and germ milled within a desirable particle size range so as to prepare visually acceptable whole grain baked products. Milling bran and germ to a desirable particle size range was more visually acceptable than flour having the bran and germ milled to ultra fine particle sizes.

Although various embodiments of the present invention have been disclosed here for purposes of illustration, it should be understood that a variety of changes, modifications and substitutions may be incorporated without departing from either the spirit or scope of the present invention.

What is claimed is:

1. A method for making a visually appealing whole grain product comprising:
    providing recombined whole grain red wheat flour having individually milled portions of endosperm, bran and germ, the bran having a bran particle size of 0.007 inches to 0.009 inches; and
    mixing said recombined whole grain red wheat flour with at least one wet ingredient to form a recombined whole grain dough mixture; and
    baking said whole grain dough mixture to make the whole grain product wherein the bran is visually indistinguishable by an unassisted eye;
    wherein the whole grain product has an L*a*b color value ratio of at least about 14.4:1:3.9.

2. The method of claim 1, wherein the germ is milled to a germ particle size from about 0.006 inches to about 0.017 inches.

3. The method of claim 2, wherein the germ particle size is from about 0.007 inches to about 0.015 inches.

4. The method of claim 1, further comprising:
    fortifying the recombined whole grain red wheat flour through the addition of one or more of bran and germ such that the amount of bran or germ exceeds an amount found in a red wheat grain kernel.

* * * * *